(12) United States Patent
Katayose et al.

(10) Patent No.: US 11,243,385 B2
(45) Date of Patent: Feb. 8, 2022

(54) ZOOM LENS AND IMAGE PICKUP APPARATUS HAVING THE SAME

(71) Applicant: CANON KABUSHIKI KAISHA, Tokyo (JP)

(72) Inventors: Masato Katayose, Utsunomiya (JP); Junya Ichimura, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/896,696

(22) Filed: Jun. 9, 2020

(65) Prior Publication Data

US 2021/0003832 A1  Jan. 7, 2021

(30) Foreign Application Priority Data

Jul. 2, 2019 (JP) .............................. JP2019-123387

(51) Int. Cl.
*G02B 15/14* (2006.01)
*G02B 15/20* (2006.01)

(52) U.S. Cl.
CPC ............... *G02B 15/145121* (2019.08); *G02B 15/145105* (2019.08); *G02B 15/20* (2013.01)

(58) Field of Classification Search
CPC ........ G02B 15/1461; G02B 15/145105; G02B 15/145121
See application file for complete search history.

(56) References Cited

U.S. PATENT DOCUMENTS

| 9,784,951 | B2 | 10/2017 | Ichimura |
| 10,139,606 | B2 | 11/2018 | Ichimura |
| 2016/0091697 | A1* | 3/2016 | Ikeda ................. G02B 15/1461 359/683 |
| 2018/0335604 | A1* | 11/2018 | Amano .................. G02B 15/17 |
| 2018/0372993 | A1 | 12/2018 | Katayose |
| 2019/0079305 | A1 | 3/2019 | Ichimura |
| 2019/0113721 | A1 | 4/2019 | Katayose |
| 2019/0187409 | A1* | 6/2019 | Noda ................. G02B 15/1461 |
| 2019/0235206 | A1 | 8/2019 | Ichimura |
| 2019/0265441 | A1 | 8/2019 | Katayose |
| 2020/0174234 | A1 | 6/2020 | Katayose |

FOREIGN PATENT DOCUMENTS

JP  2014089385 A  5/2014

* cited by examiner

*Primary Examiner* — Darryl J Collins
(74) *Attorney, Agent, or Firm* — Carter, DeLuca & Farrell LLP

(57) ABSTRACT

A zoom lens includes, in order from an object side to an image side, a first lens unit having a positive refractive power, a second lens unit having a negative refractive power, a third lens unit having a positive refractive power, a fourth lens unit having a negative refractive power, and a rear unit having a plurality of lens units, a distance between adjacent lens units changing during zooming. A predetermined condition is satisfied.

13 Claims, 12 Drawing Sheets

ZOOM LENS AND IMAGE PICKUP APPARATUS HAVING THE SAME

BACKGROUND OF THE INVENTION

Field of the Invention

The present invention relates to a zoom lens and an image pickup apparatus having the same, and one suitable for an image pickup apparatus using a solid-state image sensor such as a digital still camera, a video camera, a broadcast camera, a surveillance camera, or a camera using a silver halide film.

Description of the Related Art

The zoom lenses used for the image pickup apparatuses have recently been required to have a high optical performance over the entire zoom range with a high zoom ratio and a short overall lens length. In particular, a longitudinal (or axial) chromatic aberration and a lateral chromatic aberration tend to increase in a telephoto zoom lens having a long focal length, and thus it is important to correct the chromatic aberration for the improved image quality.

Japanese Patent Laid-Open No. ("JP") 2014-89385 discloses a zoom lens including, in order from the object side to the image side, a first lens unit having a positive refractive power, a second lens unit having a negative refractive power, a third lens unit having a positive refractive power, a fourth lens unit having a negative refractive power, and a plurality of rear units.

In the positive lead zoom lens disclosed in JP 2014-89385, the aberration generated in the first lens unit is increased by the rear units. In order to satisfactorily correct the longitudinal chromatic aberration and the lateral chromatic aberration at the telephoto end, it is effective to use a low dispersion material for the positive lens in the first lens unit. In particular, use of a material having a high anomalous dispersion for the positive lens in the first lens unit can satisfactorily correct the secondary spectrum of the lateral chromatic aberration at the telephoto end. However, if the secondary spectrum correction of the lateral chromatic aberration is excessively emphasized at the telephoto end, it becomes difficult to correct the secondary spectrum of the longitudinal chromatic aberration. This problem is particularly remarkable in the zoom lens having a high zoom ratio.

SUMMARY OF THE INVENTION

The present invention provides a zoom lens and an image pickup apparatus, each of which can correct an longitudinal chromatic aberration and a lateral chromatic aberration at a telephoto end while maintaining a high zoom ratio.

A zoom lens according to one aspect of the present invention includes, in order from an object side to an image side, a first lens unit having a positive refractive power, a second lens unit having a negative refractive power, a third lens unit having a positive refractive power, a fourth lens unit having a negative refractive power, and a rear unit having a plurality of lens units, a distance between adjacent lens units changing during zooming. At least one positive lens in the first lens unit, at least one negative lens in the second lens unit, and at least one negative lens in the fourth lens unit satisfy the following first conditional expressions $$60 < vd < 100$$

$$-0.00047 \times vd + 0.5666 < \theta gF < -0.00047 \times vd + 0.5966$$

$$-0.00274 \times vd + 0.7144 < \theta gF$$

where $vd$ is an Abbe number and $\theta gF$ is a partial dispersion ratio.

The zoom lens satisfies the following second conditional expression $$1.00 < f4/f2 < 2.00$$

where $f2$ is a focal length of the second lens unit and $f4$ is a focal length of the fourth lens unit.

An image pickup apparatus having the above zoom lens also constitutes another aspect of the present invention.

Further features of the present invention will become apparent from the following description of exemplary embodiments with reference to the attached drawings.

DESCRIPTION OF THE EMBODIMENTS

Referring now to the accompanying drawings, a detailed description will be given of embodiments according to the present invention.

A zoom lens according to each example includes, in order from an object side to an image side, a first lens unit having a positive refractive power, a second lens unit having a negative refractive power, a third lens unit having a positive refractive power, a fourth lens unit having a negative refractive power, and a rear unit having a plurality of lens units. During zooming, at least the first lens unit moves in a direction along an optical axis OA (optical axis direction), so that a distance (separation) between adjacent lens units varies.

Figure 1:
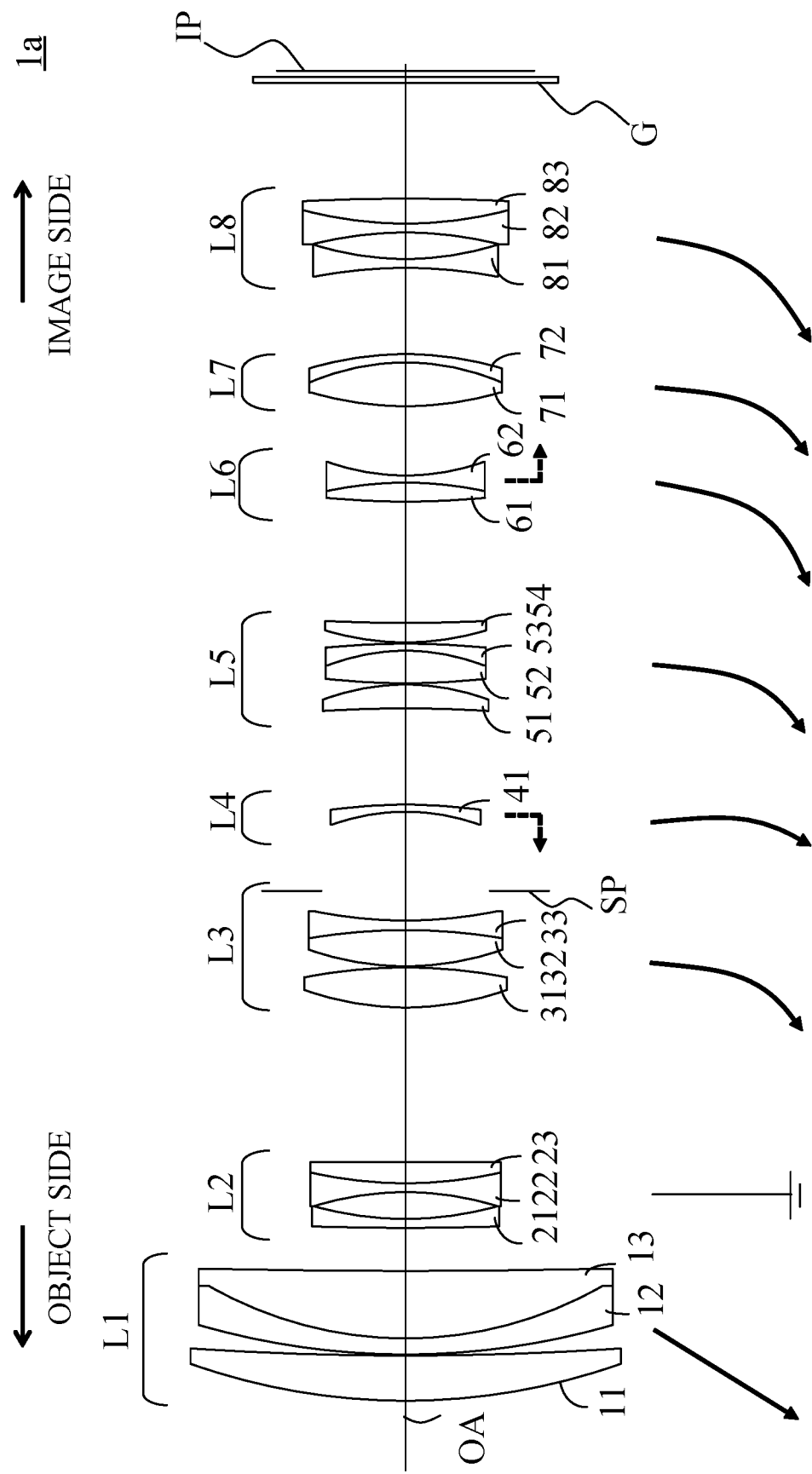
FIG. 1 is a sectional view of a zoom lens according to Example 1 at a wide-angle end.
Figure 2A:
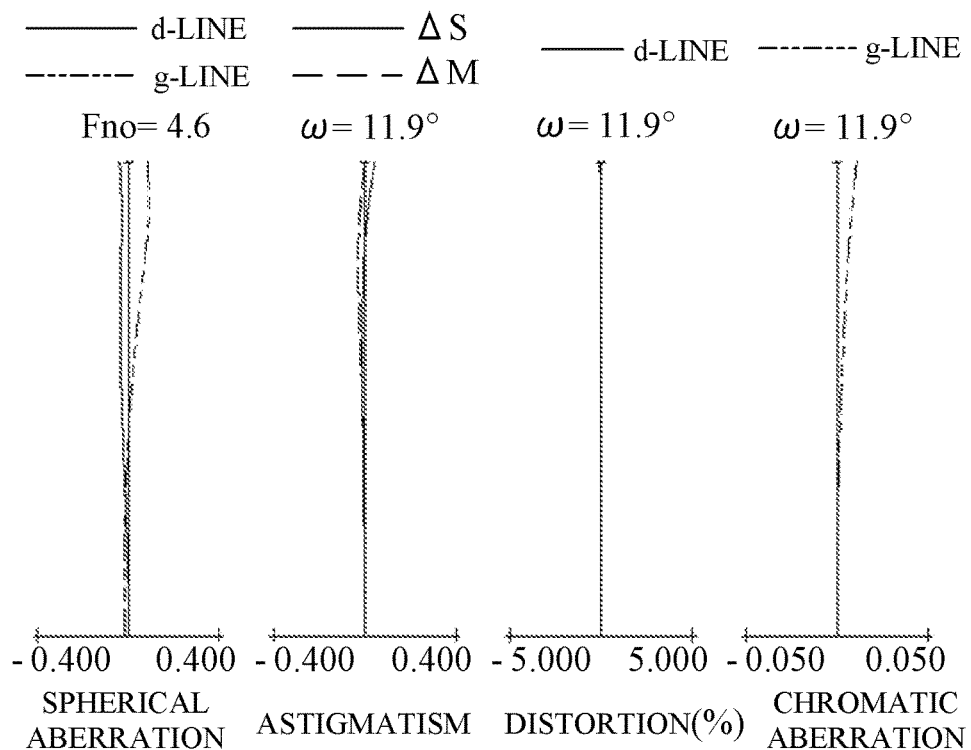
FIGS. 2A to 2C are aberration diagrams of the zoom lens according to Example 1 at the wide-angle end, a middle zoom position, and a telephoto end.
Figure 2B:
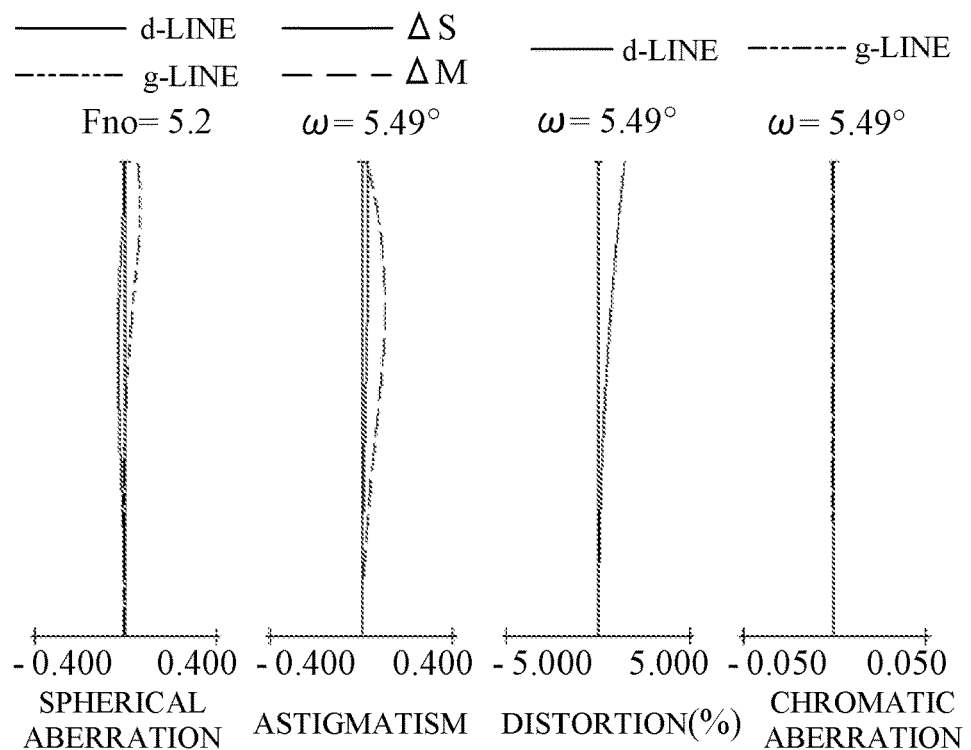
Figure 2C:
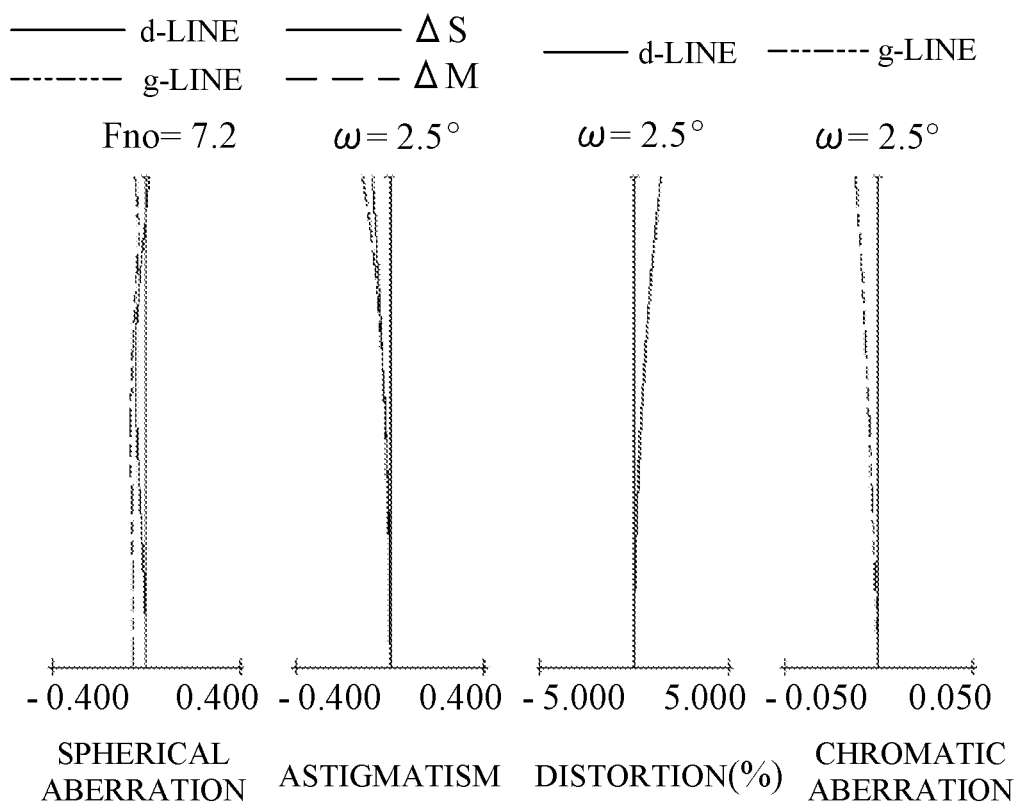
Figure 3:
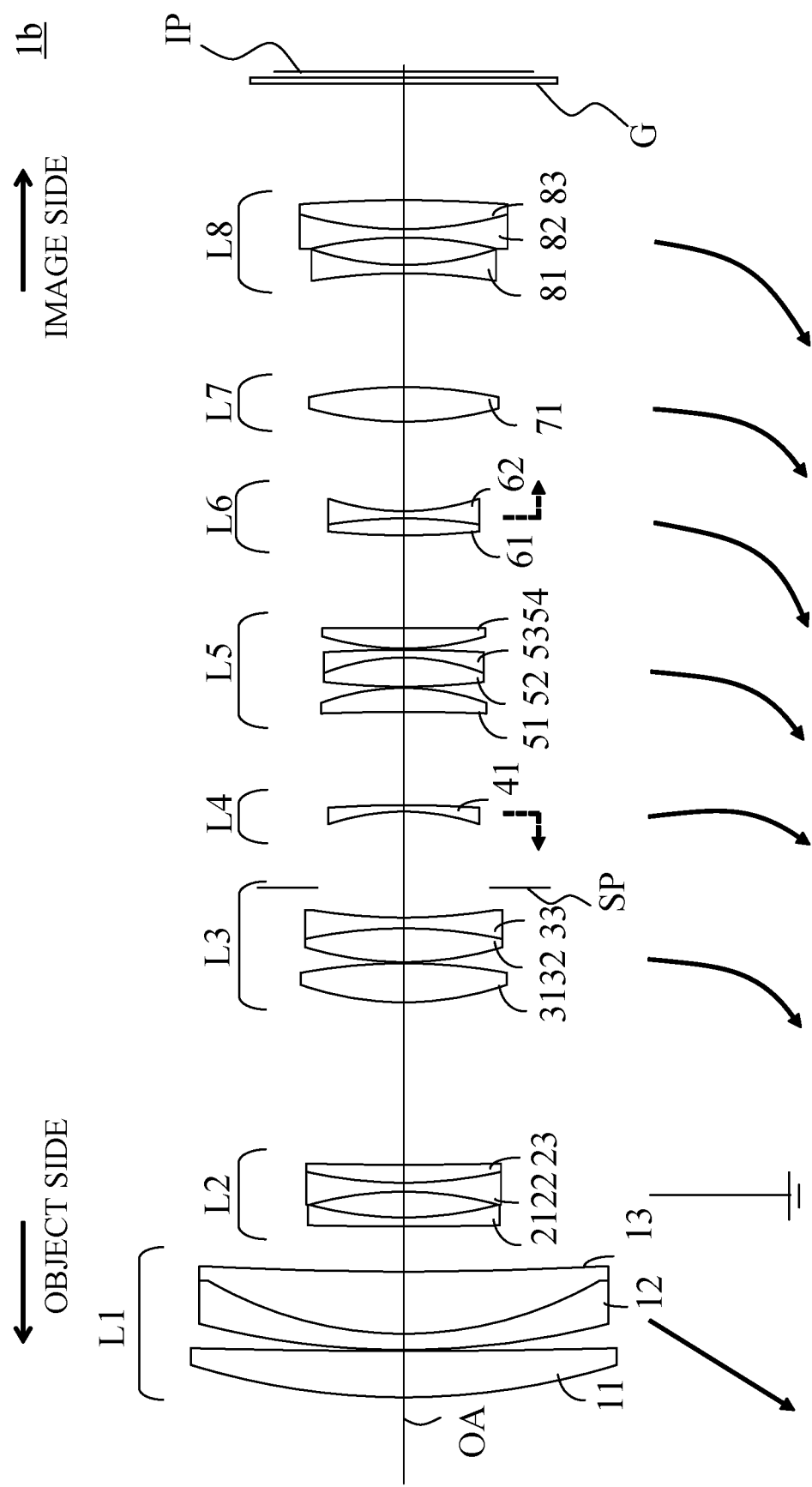
FIG. 3 is a sectional view of a zoom lens according to Example 2 at a wide-angle end.
Figure 4A:
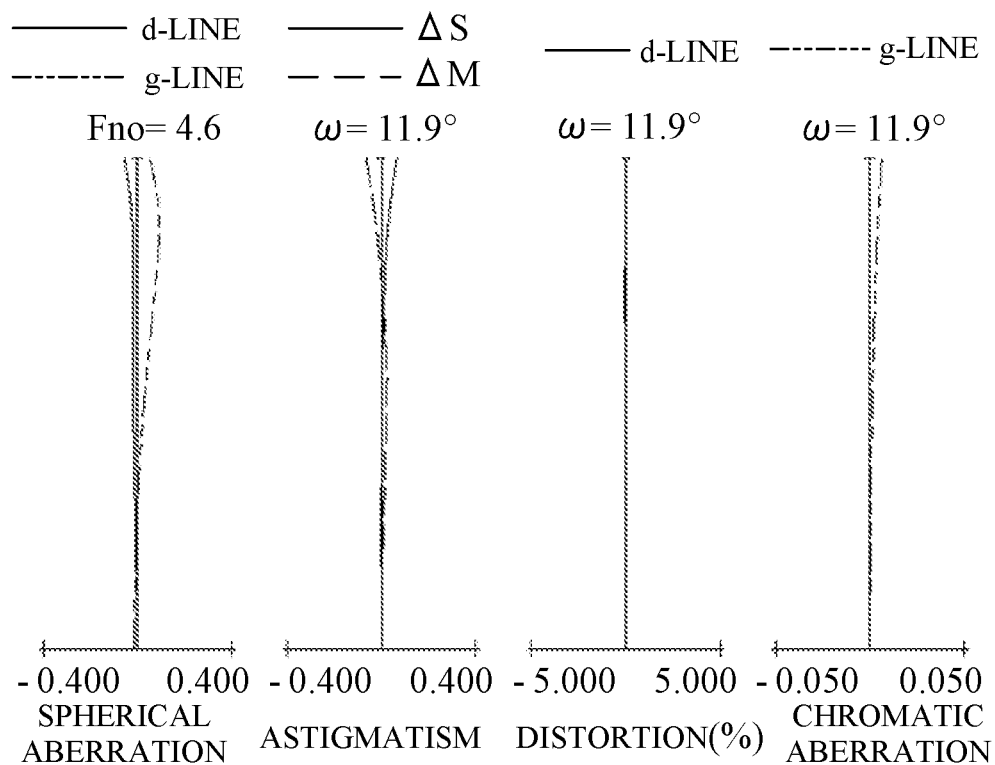
FIGS. 4A to 4C are aberration diagrams of the zoom lens according to Example 2 at the wide-angle end, a middle zoom position, and a telephoto end.
Figure 4B:
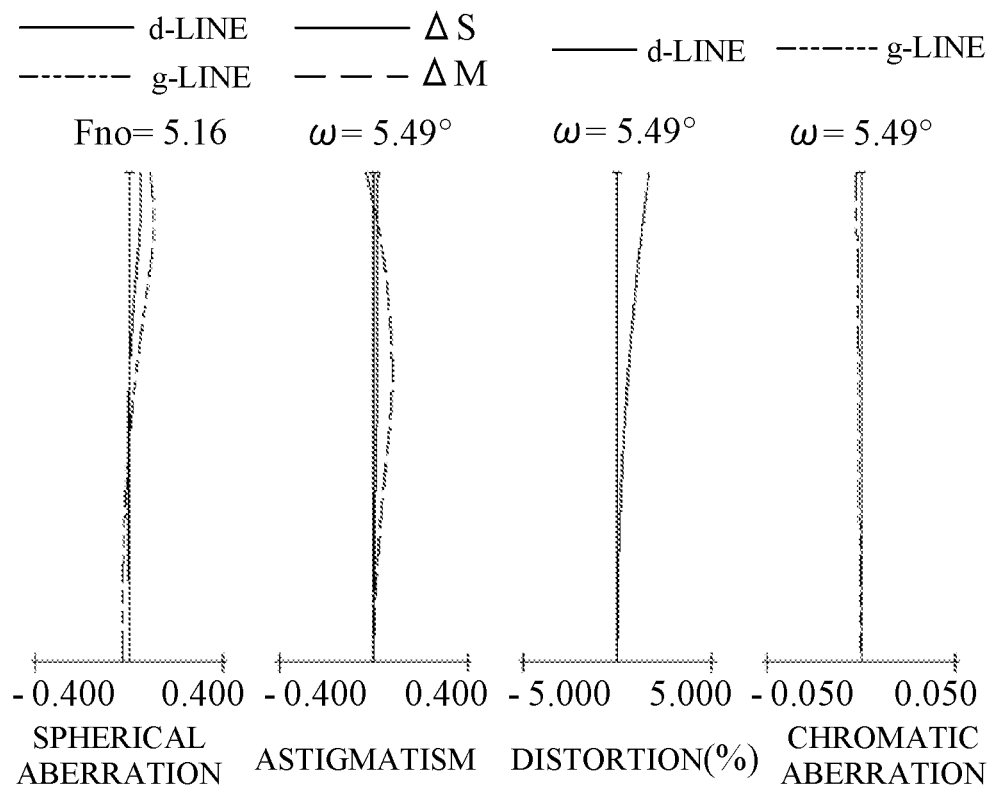
Figure 4C:
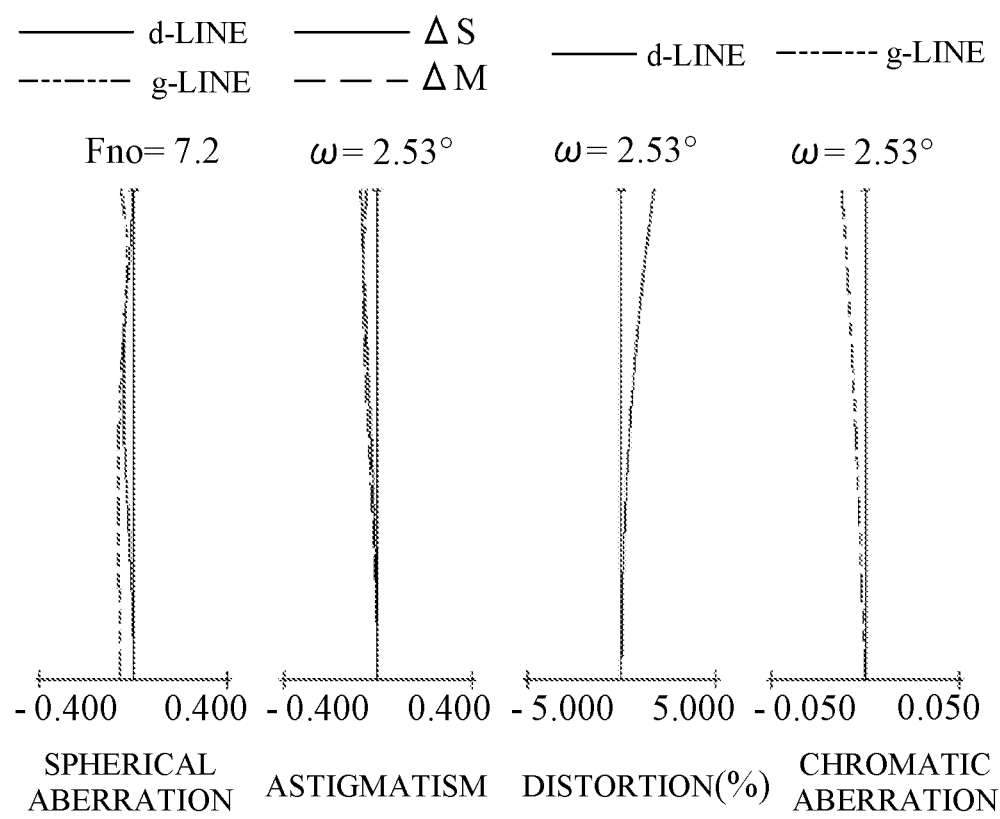
Figure 5:
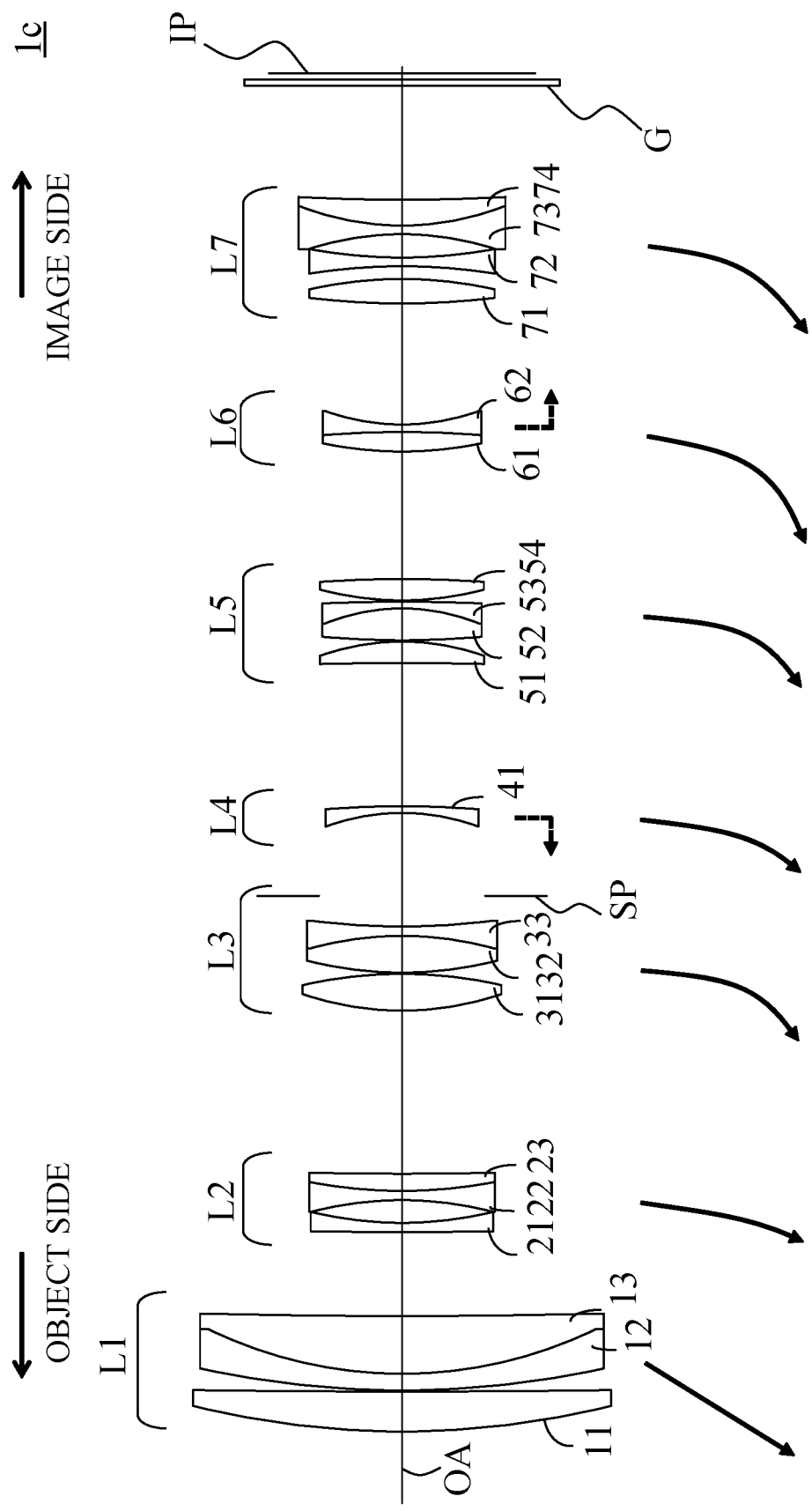
FIG. 5 is a sectional view of a zoom lens according to Example 3 at a wide-angle end.
Figure 6A:
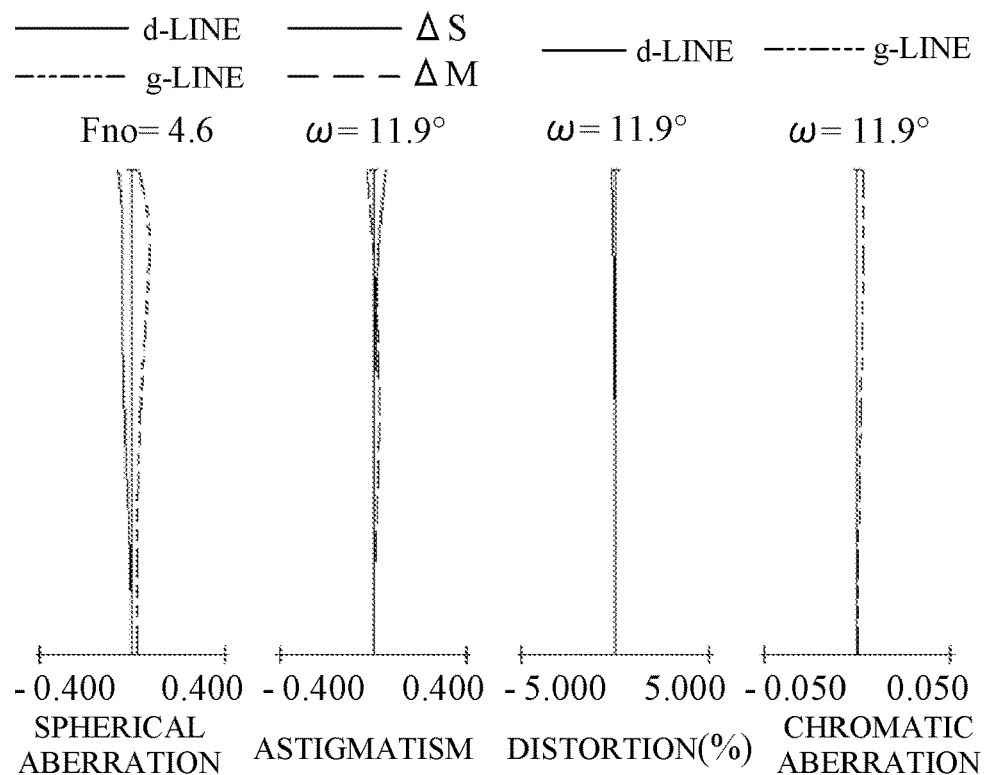
FIGS. 6A to 6C are aberration diagrams of the zoom lens according to Example 3 at the wide-angle end, a middle zoom position, and a telephoto end.
Figure 6B:
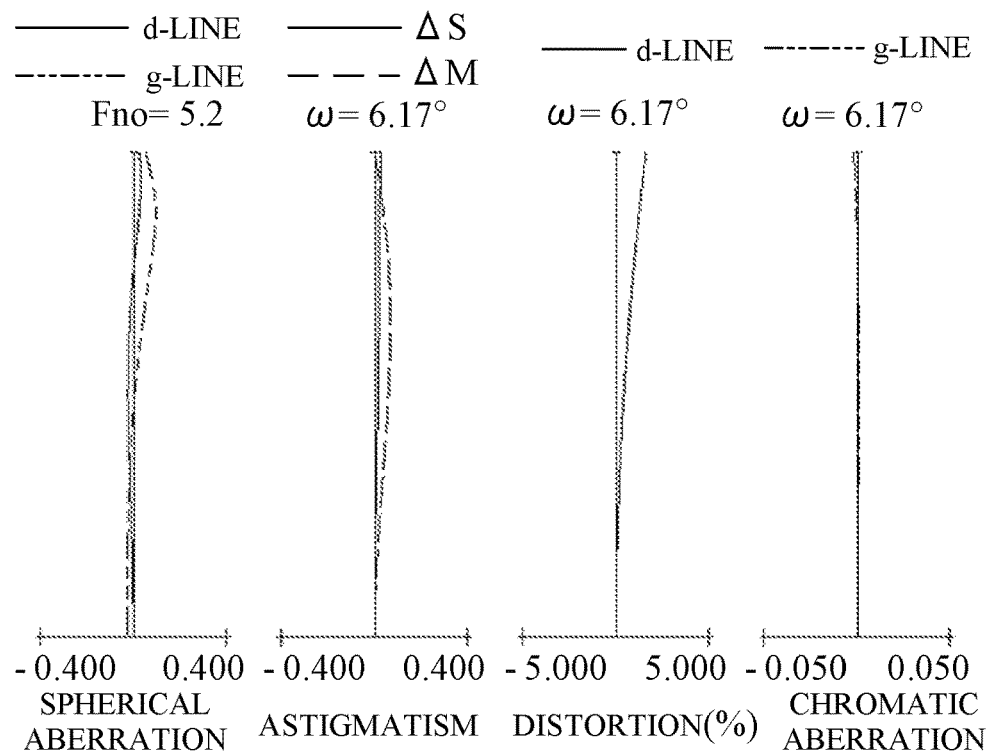
Figure 6C:
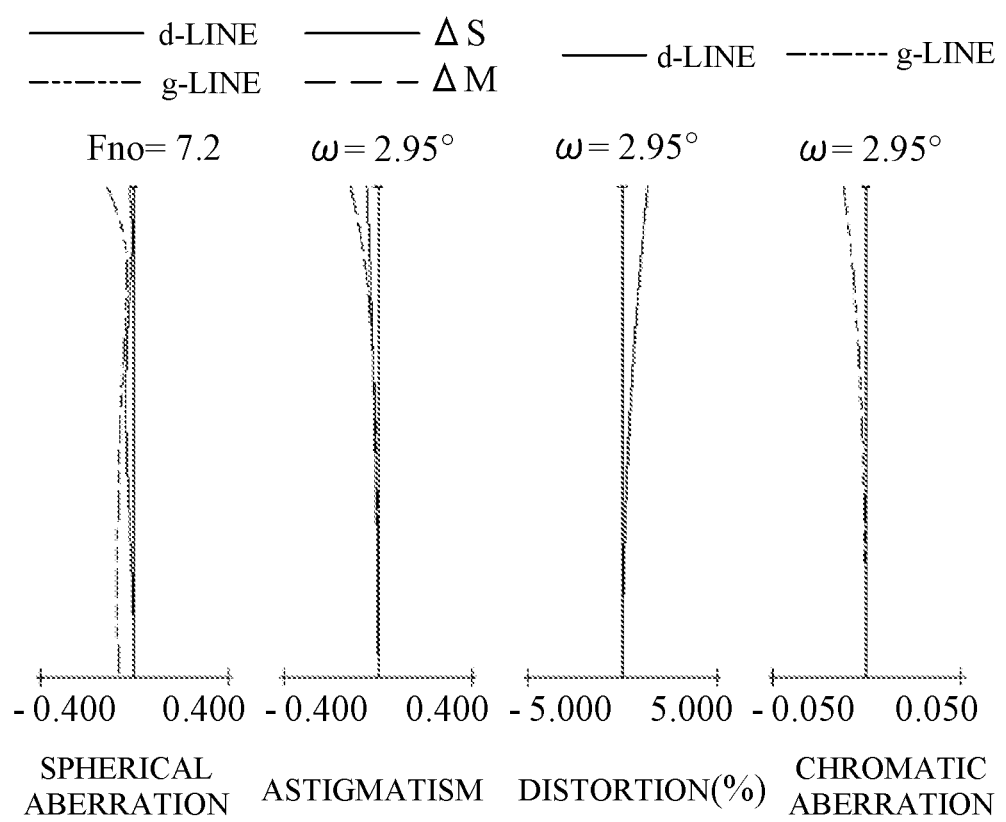
Figure 7:
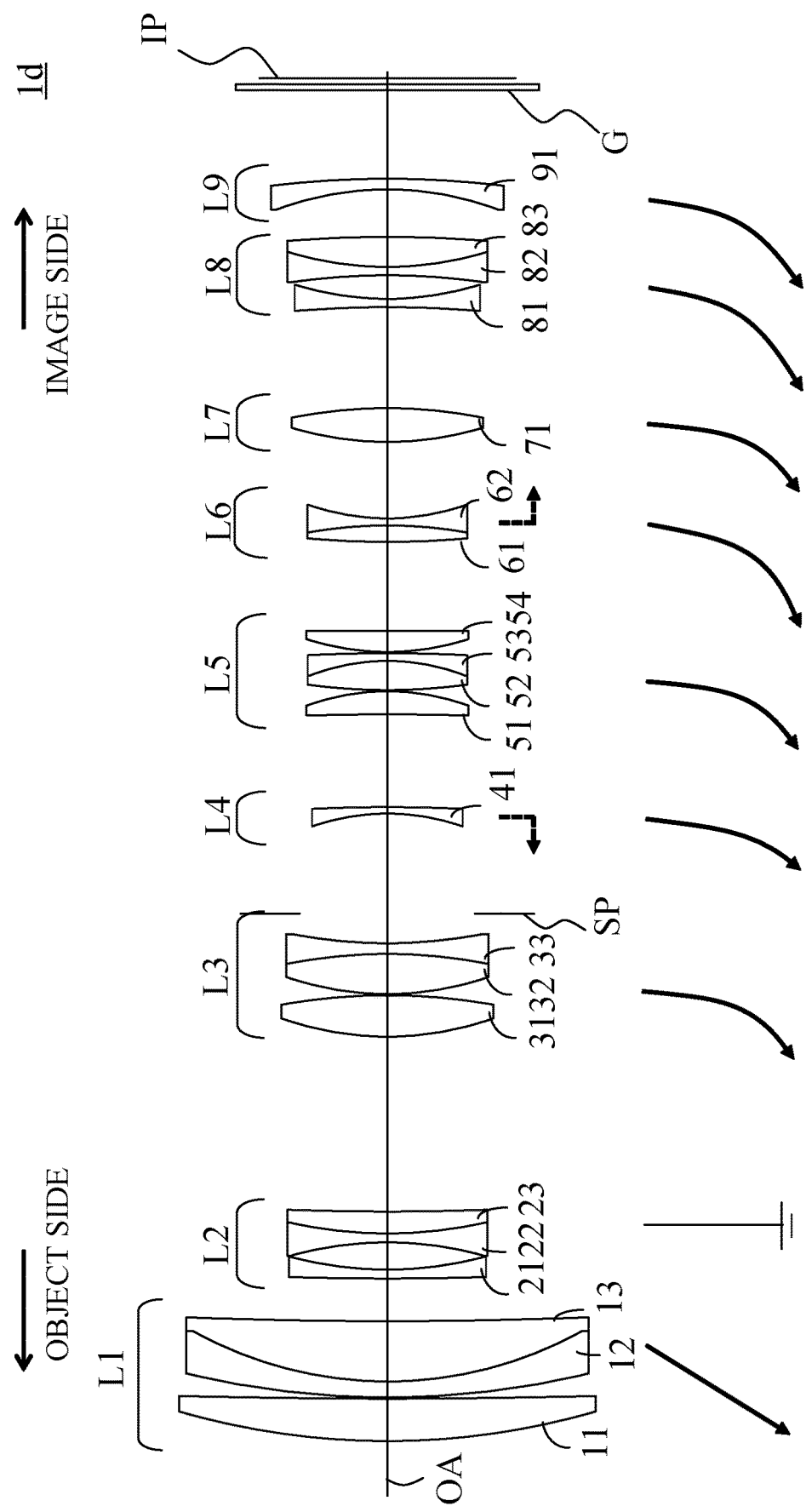
FIG. 7 is a sectional view of a zoom lens according to Example 4 at a wide-angle end.
Figure 8A:
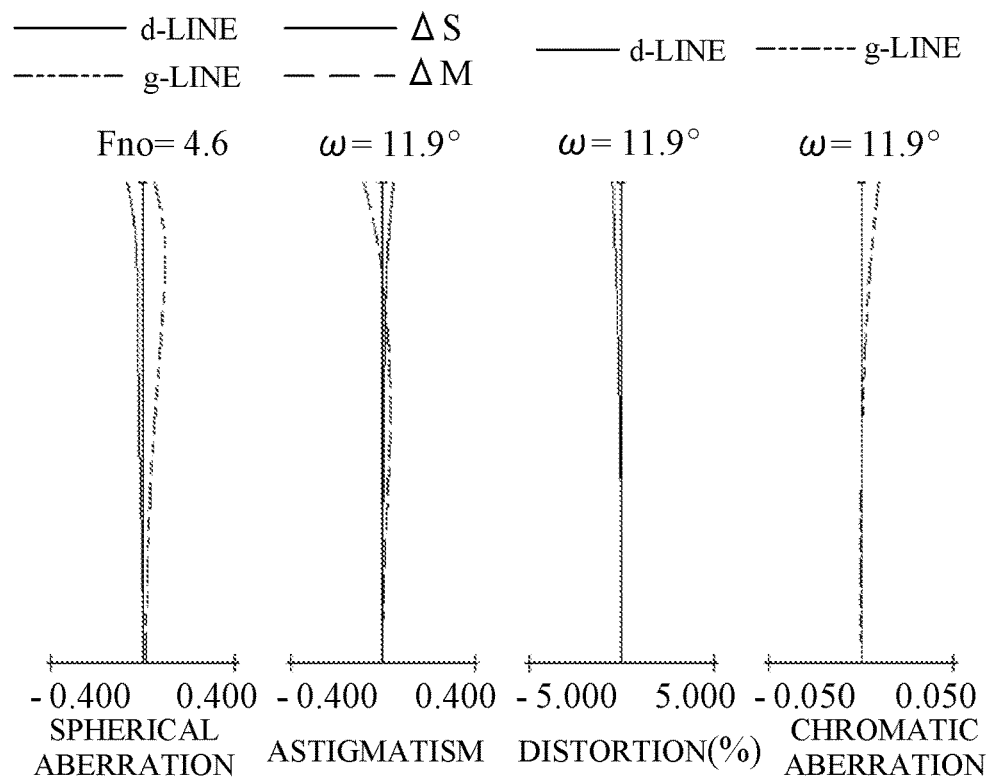
FIGS. 8A to 8C are aberration diagrams of the zoom lens according to Example 4 at the wide-angle end, a middle zoom position, and a telephoto end.
Figure 8B:
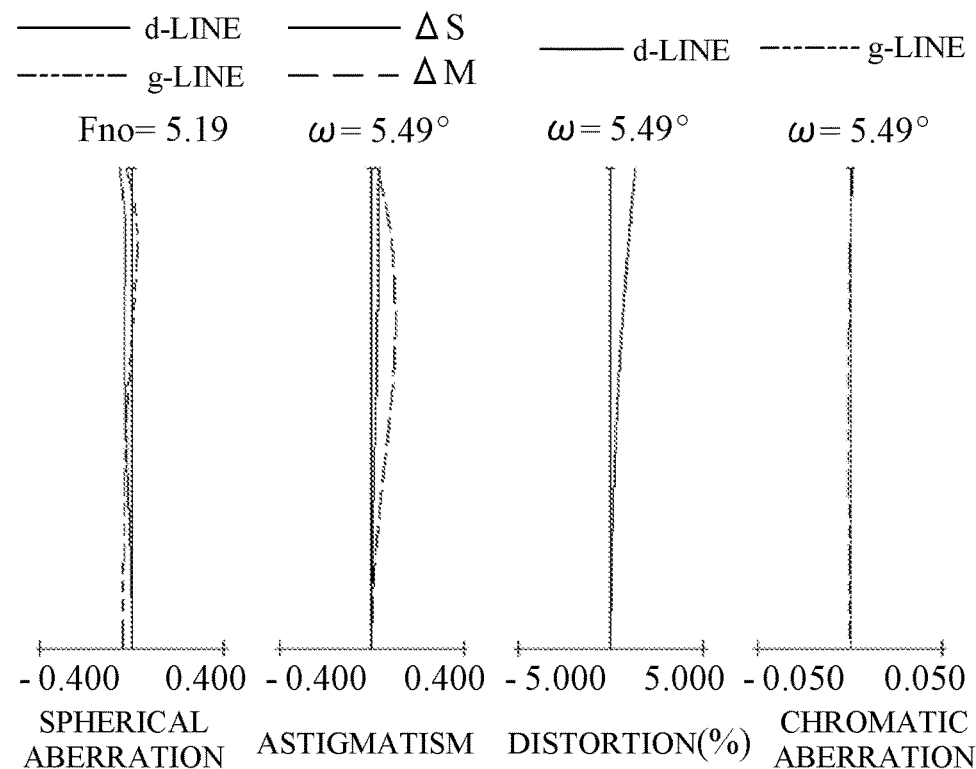
Figure 8C:
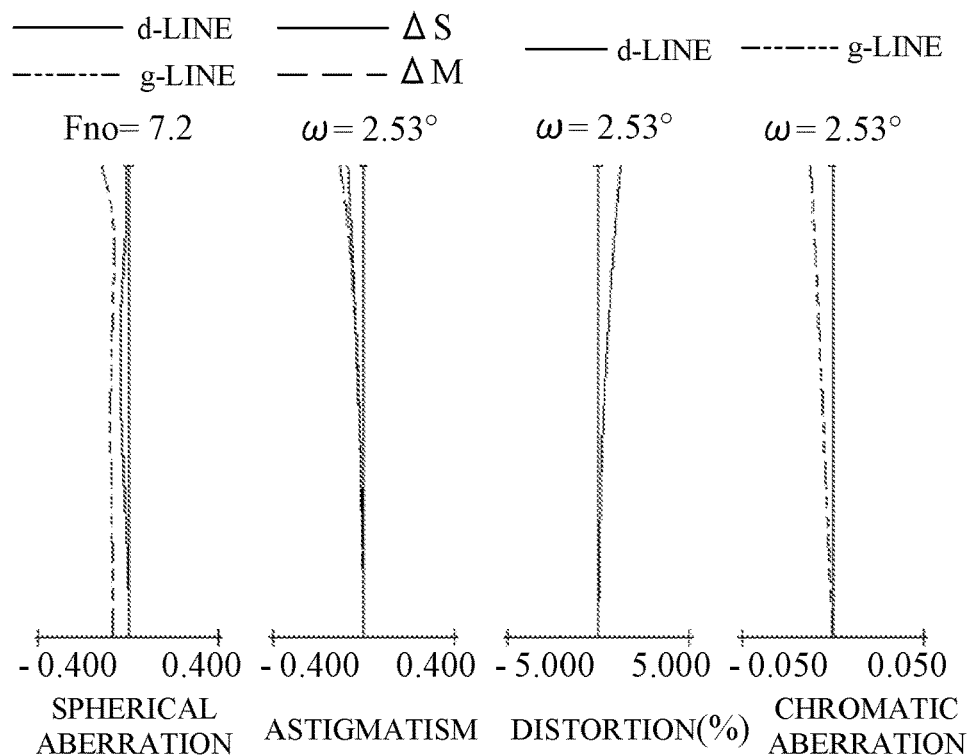

FIG. 1 is a sectional view of a zoom lens 1$a$ according to Example 1 at a wide-angle end. FIGS. 2A to 2C are aberration diagrams of the zoom lens 1$a$ at the wide-angle end, the middle zoom position, and the telephoto end, respectively. FIG. 3 is a sectional view of a zoom lens 1b according to Example 2 at the wide-angle end. FIGS. 4A to 4C are aberration diagrams of the zoom lens 1b at the wide-angle end, the middle zoom position, and the telephoto end, respectively. FIG. 5 is a sectional view of a zoom lens 1c according to Example 3 at the wide-angle end. FIGS. 6A to 6C are aberration diagrams of the zoom lens 1c at the wide-angle end, the middle zoom position, and the telephoto end, respectively. FIG. 7 is a sectional view of a zoom lens 1d according to Example 4 at the wide-angle end. FIGS. 8A to 8C are aberration diagrams of the zoom lens 1d at the wide-angle end, the middle zoom position, and the telephoto end, respectively.

The zoom lenses 1a to 1d according to the respective examples are image pickup lens systems (optical systems) each used for an image pickup apparatus such as a video camera, a digital camera, a TV cameras, a surveillance camera, and a film-based camera. In each of FIGS. 1, 3, 5, and 7, the left side indicates the object side (front side), and the right side indicates the image side (rear side).

In FIGS. 1 (Example 1) and 3 (Example 2), L1 is a first lens unit having a positive refractive power, L2 is a second lens unit having a negative refractive power, L3 is a third lens unit having a positive refractive power, and a lens unit L4 is a fourth lens unit having a negative refractive power. L5 is a fifth lens unit having a positive refractive power, L6 is a sixth lens unit having a negative refractive power, L7 is a seventh lens unit having a positive refractive power, and L8 is an eighth lens unit having a negative refractive power. The zoom lenses 1a and 1b according to Examples 1 and 2 are 8-unit zoom lenses, respectively. The fifth lens unit L5 to the eighth lens unit L8 (plurality of lens units) constitute a rear unit.

In FIG. 5 (Example 3), L1 is a first lens unit having a positive refractive power, L2 is a second lens unit having a negative refractive power, L3 is a third lens unit having a positive refractive power, and L4 is a fourth lens unit having a negative refractive power. L5 is a fifth lens unit having a positive refractive power, L6 is a sixth lens unit having a negative refractive power, and L7 is a seventh lens unit having a negative refractive power. The zoom lens 1c according to Example 3 is a 7-unit zoom lens. The fifth lens unit L5 to the seventh lens unit L7 (plurality of lens units) constitute a rear unit.

In FIG. 7 (Example 4), L1 is a first lens unit having a positive refractive power, L2 is a second lens unit having a negative refractive power, L3 is a third lens unit having a positive refractive power, and L4 is a fourth lens unit having a negative refractive power. L5 is a fifth lens unit having a positive refractive power, L6 is a sixth lens unit having a negative refractive power, L7 is a seventh lens unit having a positive refractive power, L8 is an eighth lens unit having a negative refractive power, and L9 is a ninth lens unit having a negative refractive power. The zoom lens 1d according to Example 4 is a 9-unit zoom lens. The fifth lens unit L5 to the ninth lens unit L9 (plurality of lens units) constitute a rear unit.

In each of FIGS. 1, 3, 5, and 7, SP is an aperture stop (iris stop or diaphragm), which is disposed between the third lens unit L3 and the fourth lens unit L4. G is an optical element such as an optical filter, a face plate, a crystal low-pass filter, an infrared cut filter, or the like. IP is an image plane. When each zoom lens is used as an image pickup optical system for a video camera or a digital still camera, an image sensor (photoelectric conversion element) such as a CCD sensor and a CMOS sensor is disposed on the image plane IP. When each zoom lens is used for a film-based camera, a photosensitive plane corresponding to the film surface is disposed on the image plane IP.

In the aberrational diagrams in FIGS. 2A to 2C, 4A to 4C, 6A to 6C, and 8A to 8C, a solid line and an alternate long and two short dashes line relating to the spherical aberration represent the d-line and g-line, and M (dotted line) and ΔS (solid line) relating to the astigmatism represent a meridional image plane and a sagittal image plane, respectively. The lateral chromatic aberration is represented by the g-line. ω is a half angle of view (degree) corresponding to a half value of the imaging angle of view, and Fno is an F-number (aperture value).

In each example, during zooming from the wide-angle end to the telephoto end, each lens unit is moved as shown by solid arrows in FIGS. 1, 3, 5, and 7.

More specifically, in Examples 1 and 2, the first lens unit L1 moves to the object side during zooming from the wide-angle end to the telephoto end. The second lens unit L2 is fixed relative to the image plane IP during zooming. The third lens unit L3 moves to the object side. The aperture stop SP moves together with the third lens unit L3. The fourth lens unit L4 moves to the object side. The fifth lens unit L5 moves to the object side. The sixth lens unit L6 moves to the object side. The seventh lens unit L7 moves to the object side. The eighth lens unit L8 moves to the object side. The third lens unit L3, the fifth lens unit L5, and the seventh lens unit L7 move along the same locus during zooming.

In Example 3, during zooming from the wide-angle end to the telephoto end, the first lens unit L1 moves to the object side. The second lens unit L2 moves to the object side. The third lens unit L3 moves to the object side. The aperture stop SP moves together with the third lens unit L3. The fourth lens unit L4 moves to the object side. The fifth lens unit L5 moves to the object side. The sixth lens unit L6 moves to the object side. The seventh lens unit L7 moves to the object side. The third lens unit L3 and the fifth lens unit L5 move along the same locus during zooming.

In Example 4, the first lens unit L1 moves to the object side during zooming from the wide-angle end to the telephoto end. The second lens unit L2 is fixed relative to the image plane IP during zooming. The third lens unit L3 moves to the object side. The aperture stop SP moves together with the third lens unit L3. The fourth lens unit L4 moves to the object side. The fifth lens unit L5 moves to the object side. The sixth lens unit L6 moves to the object side. The seventh lens unit L7 moves to the object side. The eighth lens unit L8 moves to the object side. The ninth lens unit L9 moves to the object side. The third lens unit L3, the fifth lens unit L5, and the seventh lens unit L7 move along the same locus during zooming.

In each example, the fourth lens unit L4 and the sixth lens unit L6 are moved on different loci so as to correct the image plane variation associated with zooming and to perform focusing. Focusing from an infinitely distant object to a short-distance object is performed by moving the fourth lens unit L4 forward and the sixth lens unit L6 backward as indicated by dotted arrows in FIGS. 1, 3, 5, and 7. However, in each example, focusing is not limited to the configuration performed by using the fourth lens unit L4 and the sixth lens unit L6, and may be performed by using other lens units singularly or in combination.

The zoom lens according to each example includes, in order from the object side to the image side, a first lens unit L1 having a positive refractive power, a second lens unit L2 having a negative refractive power, a third lens unit L3 having a positive refractive power, a fourth lens unit L4 having a negative refractive power, and a rear unit having a plurality of lens units. At least one positive lens in the first lens unit L1, at least one negative lens in the second lens unit L2, and at least one negative lens in the fourth lens unit L4 satisfy the following conditional expressions (1), (2), and (3) or first conditional expressions:

$$60 < \nu d < 100 \tag{1}$$

$$-0.00047 \times \nu d + 0.5666 < \theta gF < -0.00047 \times \nu d + 0.5966 \tag{2}$$

$$-0.00274 \times \nu d + 0.7144 < \theta gF \tag{3}$$

where $\nu d$ is an Abbe number and $\theta gF$ is a partial dispersion ratio for the d-line.

In addition, in each embodiment, the following second conditional expression (4) or second conditional expression is satisfied:

$$1.00 < f4/f2 < 2.00 \tag{4}$$

wherein f2 is a focal length of the second lens unit L2 and f4 is a focal length of the fourth lens unit L4.

In a zoom lens with a high zoom ratio, it is effective to use a low-dispersion material for the positive lens in the first lens unit L1 having the positive refractive power in order to suppress the longitudinal chromatic aberration and the lateral chromatic aberration at the telephoto end. In order to satisfactorily correct the secondary spectrum of the lateral chromatic aberration at the telephoto end, a material having a high anomalous dispersion may be used for the positive lens in the first lens unit L1. When a large amount of a material having a low dispersion and a high anomalous dispersion is used for the positive lens in the first lens unit L1, it is possible to satisfactorily correct the longitudinal chromatic aberration for the C-line and the F-line at the telephoto end but it becomes difficult to correct the secondary spectrum of the longitudinal chromatic aberration. One solution for this problem is to use a material having a low dispersion and a high anomalous dispersion for a concave lens disposed at a position where the influence on the lateral chromatic aberration at the telephoto end is relatively small and the influence on the longitudinal chromatic aberration is large. That is, this lens may be disposed near the aperture stop SP and at a position where the separation between the on-axis light beam and the off-axis light beam is small.

Therefore, each example disposes the above lenses as the concave lenses in the second lens unit L2 and the fourth lens unit L4. When the positive lens in the first lens unit L1, the negative lens in the second lens unit L2, and the negative lens in the fourth lens unit L4 satisfy the conditional expressions (1), (2), and (3), or the first conditional expressions, the longitudinal chromatic aberration and the lateral chromatic aberration can be satisfactorily corrected at the telephoto end. In obtaining the effect of the present invention by this action, the configuration of the rear unit is not particularly limited.

At least two positive lenses in the first lens unit L1 may satisfy the first conditional expressions. At least one positive lens in the third lens unit L3 may satisfy the first conditional expressions.

The conditional expression (4) is a conditional expression that properly determines the focal length f2 of the second lens unit L2 and the focal length f4 of the fourth lens unit L4 in order to satisfactorily correct the longitudinal chromatic aberration at the telephoto end. If the focal length of the fourth lens unit L4 becomes longer and exceeds the upper limit of the conditional expression (4), the effect of correcting the longitudinal chromatic aberration at the telephoto end becomes too small. On the other hand, if the focal length of the fourth lens unit L4 becomes shorter and exceeds the lower limit of the conditional expression (4), it becomes difficult to correct the spherical aberration and the like at the telephoto end.

The numerical range of the conditional expression (4) may be set so as to satisfy the following conditional expression (4a).

$$1.20 < f4/f2 < 1.90 \tag{4a}$$

The numerical range of the conditional expression (4a) may be set so as to satisfy the following conditional expression (4b).

$$1.40 < f4/f2 < 1.80 \tag{4b}$$

The above configuration can realize a zoom lens that has a high zoom ratio but has the well-corrected longitudinal and lateral chromatic aberrations at the telephoto end.

In each example, assume that f1 is a focal length of the first lens unit L1, f3 is a focal length of the third lens unit L3, fw is a focal length of the zoom lens at the wide-angle end, and ft is a focal length of the zoom lens at the telephoto end. In the second lens unit L2, fn2 is at least one focal length of the negative lens Ln2 that satisfies the conditional expressions (1), (2), and (3), and in the third lens unit L3, fp3 is at least one focal length of the positive lens Lp3 that satisfies the conditions (1), (2). and (3). Then, at least one of the following conditional expressions (5) to (8) may be satisfied.

$$0.30 < f1/ft < 0.70 \tag{5}$$

$$0.80 < fn2/f2 < 1.50 \tag{6}$$

$$0.50 < fp3/f3 < 1.10 \tag{7}$$

$$3.5 < ft/fw < 7.0 \tag{8}$$

The conditional expression (5) is a conditional expression that properly determines the focal length f1 of the first lens unit L1 and the focal length ft of the zoom lens at the telephoto end in order to satisfactorily correct the lateral chromatic aberration at the telephoto end and to shorten the overall lens length at the telephoto end. If the focal length of the first lens unit L1 becomes longer and exceeds the upper limit of the conditional expression (5), a moving amount of the first lens unit L1 during zooming from the wide-angle end to the telephoto end becomes too large, the overall lens length at the telephoto end becomes long, and a compact configuration becomes difficult. On the other hand, when the focal length of the first lens unit L1 becomes shorter and exceeds the lower limit of the conditional expression (5), the longitudinal chromatic aberration and the lateral chromatic aberration generated in the first lens unit L1 become large, so that it becomes difficult to correct the longitudinal and lateral chromatic aberrations at the telephoto end.

The conditional expression (6) is a conditional expression that properly determines the focal length fn2 of the negative lens Ln2 and the focal length f2 of the second lens unit L2. If the focal length of the negative lens Ln2 becomes longer and exceeds the upper limit of the conditional expression (6), the effect of correcting the longitudinal chromatic aberration at the telephoto end becomes too small. On the other hand, if the focal length fn2 of the negative lens Ln2 becomes shorter and exceeds the lower limit of the conditional expression (6), it becomes difficult to satisfactorily correct various aberrations such as the curvature of field at the wide-angle end.

The conditional expression (7) is a conditional expression that properly determines the focal length fp3 of the positive lens Lp3 and the focal length f3 of the third lens unit L3. If the focal length of the positive lens Lp3 becomes longer and exceeds the upper limit of the conditional expression (7), the effect of correcting the longitudinal chromatic aberration at the telephoto end becomes too small. On the other hand, if the focal length fp3 of the positive lens Lp3 becomes shorter and exceeds the lower limit of the conditional expression (7), it becomes difficult to satisfactorily correct the spherical aberration at the telephoto end.

The conditional expression (8) is a conditional expression that defines the zoom ratio of the zoom lens. When the value is set so as not to exceed the upper limit of the conditional expression (8), the high optical performance can be achieved over the entire zoom range with a compact configuration. When the value is set so as not to exceed the lower limit of the conditional expression (8), proper imaging angles of view can be obtained in various imaging scenes.

In each example, the numerical ranges of the conditional expressions (5) to (8) may be set as in the following expressions (5a) to (8a).

$$0.35 < f1/ft < 0.60 \quad (5a)$$

$$0.90 < fn2/f2 < 1.30 \quad (6a)$$

$$0.60 < fp3/f3 < 1.00 \quad (7a)$$

$$3.8 < ft/fw < 6.0 \quad (8a)$$

The numerical ranges of conditional expressions (5a) to (8a) may be set as in the following conditional expressions (5b) to (8b). This makes it possible to maximize the effect of each conditional expression.

$$0.40 < f1/ft < 0.55 \quad (5b)$$

$$1.00 < fn2/f2 < 1.20 \quad (6b)$$

$$0.70 < fp3/f3 < 0.90 \quad (7b)$$

$$4.0 < ft/fw < 5.0 \quad (8b)$$

Each example can obtain a zoom lens having the well-corrected longitudinal and lateral chromatic aberrations at the telephoto end with a high zoom ratio. In each example, the second lens unit L2 having a negative refractive power is moved so as to have a component in the direction orthogonal to the optical axis OA, and the image is displaced in the direction orthogonal to the optical axis OA. Thereby, the blurs of the captured image are corrected (or the image stabilization is performed) when the entire optical system (zoom lens) vibrates (tilts).

In each example, the second lens unit L2 is moved in the direction orthogonal to the optical axis OA for the image stabilization, but as long as the moving method moves the second lens unit L2 or its part so as to have a component orthogonal to the optical axis OA, the blurs of the image can be corrected. For example, if the barrel structure is allowed to be complicated, the second lens unit L2 or its part may be rotated so as to have the center of rotation on the optical axis for the image stabilization. The image stabilization may be performed by the third lens unit L3. The image stabilization may be performed by simultaneously moving a plurality of lens units or part of the lens units.

In order to satisfactorily correct the longitudinal and lateral chromatic aberrations at the telephoto end with a high zoom ratio as in each example, the first lens unit L1 may include, in order from the object side, a positive lens 11 and a cemented lens of a negative lens 12 and a positive lens 13. Use of a material having a low dispersion and a high anomalous dispersion for each of the positive lenses 11 and 13 can properly correct the secondary spectrum of the lateral chromatic aberration at the telephoto end.

In each example, the second lens unit L2 may include, in order from the object side, a negative lens 21, and a cemented lens of a negative lens 22 and a positive lens 23. This configuration can properly correct the curvature of field and the lateral chromatic aberration at the wide-angle end. Use of a material having a low dispersion and a high anomalous dispersion for the negative lens 22 can properly correct the secondary spectrum of the longitudinal chromatic aberration at the telephoto end.

In each example, the third lens unit L3 may include, in order from the object side, a positive lens 31, and a cemented lens of a positive lens 32 and a negative lens 33. This configuration can satisfactorily correct the spherical aberration and longitudinal chromatic aberration in the entire zoom range. Use of a material having low dispersion and a high anomalous dispersion for the positive lens 31 can satisfactorily correct the longitudinal chromatic aberration at the telephoto end.

In each example, the fourth lens unit L4 may include a negative lens 41. The negative lens 41 may have a shape with a concave surface facing the object side. This configuration can properly correct the spherical aberration in the entire zoom range with the minimum number of lenses, which is advantageous to making compact the optical system (zoom lens). Use of a material having a low dispersion and a high anomalous dispersion for the negative lens 41 can satisfactorily correct the secondary spectrum of the longitudinal chromatic aberration at the telephoto end.

In each example, the fifth lens unit L5 may include, in order from the object side, a positive lens 51, a cemented lens of a positive lens 52 and a negative lens 53, and a positive lens 54. This configuration can satisfactorily correct the spherical aberration, coma aberration, and longitudinal chromatic aberration in the entire zoom range. Use of a material having a low dispersion and a high anomalous dispersion for the positive lens 54 can satisfactorily correct the secondary spectrum of the lateral chromatic aberration at the wide angle end. At least one positive lens in the fifth lens unit L5 may satisfy the first conditional expressions.

In each example, the sixth lens unit L6 may include a cemented lens of a positive lens 61 and a negative lens 62 in order from the object side. The negative lens 62 may include a shape with a concave surface facing the image side. This configuration can satisfactorily correct the coma aberration and the curvature of field in the entire zoom range.

In Example 1, the seventh lens unit L7 may include a cemented lens of a positive lens 71 and a negative lens 72 in order from the object side. In Examples 2 and 4, the seventh lens unit L7 may include the positive lens 71. This configuration can satisfactorily correct the off-axis aberrations such as the coma over the entire zoom range from the wide-angle end to the telephoto end. In Example 3, the seventh lens unit L7 may include a positive lens 71, a negative lens 72, and a cemented lens of a negative lens 73 and a positive lens 74. Use of a material having a low dispersion and a high anomalous dispersion for each of the negative lenses 72 and 73 can satisfactorily correct the secondary spectrum of the lateral chromatic aberration at the telephoto end.

In Examples 1, 2, and 4, the eighth lens unit L8 may include, in order from the object side, a negative lens 81 and a cemented lens of a negative lens 82 and a positive lens 83. Use of a material having a low dispersion and a high anomalous dispersion for each of the negative lenses 81 and 82 can satisfactorily correct the secondary spectrum of the lateral chromatic aberration at the telephoto end.

In Example 4, the ninth lens unit L9 may include a negative lens 91. Use of a material having a low dispersion and a high anomalous dispersion for the negative lens 91 can satisfactorily correct the secondary spectrum of the lateral chromatic aberration at the telephoto end.

In each of the examples, the lens unit disposed closest to the image (plane) in the rear unit may have a negative refractive power, and at least one negative lens in the lens units having a negative refractive power satisfies the first conditional expressions.

Each example can obtain a zoom lens that can satisfactorily correct the longitudinal and lateral chromatic aberrations at the telephoto end even with a high zoom ratio.

Next follows numerical examples 1 to 4 corresponding to Examples 1 to 4. In the surface data of each numerical example, r represents a radius of curvature of each optical surface, and d (mm) represents an axial gap or distance (distance on the optical axis) between an m-th surface and an (m+1)-th surface. However, m is the number of the surface counted from the light incident side (object side). In each numerical example, the last two surfaces are surfaces of optical blocks such as filters and face plates. Further, nd represents a refractive index of each optical element for the d-line, νd represents an Abbe number for the d-line of the optical element, and θgF represents the partial dispersion ratio. The Abbe number νd and the partial dispersion ratio θgF of a certain material are expressed as follows where Ng, NF, NC, and Nd are refractive indexes of the materials for the g-line (wavelength 435.8 nm), the F-line (486.1 nm), the C-line (656.3 nm), and the d-line (587.6 nm).

$$\nu d = (Nd-1)/(NF-NC) \quad (9)$$

$$\theta gF = (Ng-NF)/(NF-NC) \quad (10)$$

In each numerical example, d, focal length f (mm), F number Fno, and half angle of view (degree) are all values when the zoom lens according to each example focuses on an object at infinity. A "backfocus" is a distance on the optical axis from the final lens surface (lens surface closest to the image (plane)) to the paraxial image plane, which is expressed in air equivalent length. An "overall lens length" is a length obtained by adding the backfocus to a distance on the optical axis from the frontmost surface (lens surface closest to the object (plane)) to the final surface of the zoom lens. A "lens unit" is not limited to a plurality of lenses, and may include only a single lens. Table 1 shows a relationship between the above conditional expressions and various numerical values in the numerical examples.

Numerical Example 1

UNIT mm

Surface data

| surface number | r | d | nd | νd | θgF |
|---|---|---|---|---|---|
| 1 | 108.439 | 7.60 | 1.49700 | 81.54 | 0.5375 |
| 2 | 541.742 | 0.20 | | | |
| 3 | 124.674 | 2.70 | 1.83481 | 42.74 | 0.5648 |
| 4 | 66.426 | 11.37 | 1.49700 | 81.54 | 0.5375 |
| 5 | 1553.873 | (variable) | | | |
| 6 | 502.135 | 1.50 | 1.72916 | 54.68 | 0.5444 |
| 7 | 56.262 | 4.52 | | | |

-continued

UNIT mm

| | | | | | |
|---|---|---|---|---|---|
| 8 | −51.317 | 1.50 | 1.49700 | 81.54 | 0.5375 |
| 9 | 71.789 | 3.60 | 1.76182 | 26.52 | 0.6136 |
| 10 | −2285.939 | (variable) | | | |
| 11 | 50.664 | 6.74 | 1.43875 | 94.66 | 0.5340 |
| 12 | −88.025 | 0.20 | | | |
| 13 | 48.786 | 6.10 | 1.62004 | 36.26 | 0.5879 |
| 14 | −95.684 | 1.60 | 1.95375 | 32.32 | 0.5898 |
| 15 | 75.879 | 5.00 | | | |
| 16 (diaphragm) | ∞ | (variable) | | | |
| 17 | −36.113 | 1.20 | 1.59410 | 60.47 | 0.5550 |
| 18 | −89.480 | (variable) | | | |
| 19 | −213.979 | 4.00 | 1.69895 | 30.13 | 0.6030 |
| 20 | −39.128 | 0.20 | | | |
| 21 | 116.172 | 5.50 | 1.48749 | 70.23 | 0.5300 |
| 22 | −35.878 | 1.20 | 2.05090 | 26.94 | 0.6054 |
| 23 | −131.552 | 0.20 | | | |
| 24 | 45.954 | 3.28 | 1.49700 | 81.54 | 0.5375 |
| 25 | 277.018 | (variable) | | | |
| 26 | 135.907 | 3.21 | 1.64769 | 33.79 | 0.5938 |
| 27 | −62.136 | 1.20 | 1.77250 | 49.60 | 0.5520 |
| 28 | 38.802 | (variable) | | | |
| 29 | 55.780 | 7.37 | 1.53172 | 48.84 | 0.5631 |
| 30 | −40.294 | 1.40 | 1.76182 | 26.52 | 0.6136 |
| 31 | −55.752 | (variable) | | | |
| 32 | −80.130 | 1.50 | 1.59282 | 68.63 | 0.5446 |
| 33 | 50.828 | 4.46 | | | |
| 34 | −62.892 | 1.50 | 1.49700 | 81.54 | 0.5375 |
| 35 | 66.944 | 4.21 | 1.72047 | 34.71 | 0.5834 |
| 36 | −350.979 | (variable) | | | |
| 37 | ∞ | 1.00 | 1.51633 | 64.14 | 0.5353 |
| 38 | ∞ | 1.00 | | | |
| image plane | ∞ | | | | |

VARIOUS DATA
Zoom ratio 4.81

| | wide-angle | middle | Telephoto |
|---|---|---|---|
| Focal length | 103.00 | 225.00 | 495.00 |
| F-number | 4.60 | 5.20 | 7.20 |
| Half angle of view (degree) | 11.86 | 5.49 | 2.50 |
| Image height | 21.64 | 21.64 | 21.64 |
| Overall lens length | 223.66 | 284.93 | 313.67 |
| BF | 21.17 | 31.39 | 56.97 |
| d 5 | 7.25 | 68.53 | 97.26 |
| d10 | 26.00 | 19.30 | 2.50 |
| d16 | 13.34 | 20.69 | 27.55 |
| d18 | 16.21 | 8.86 | 2.00 |
| d25 | 20.42 | 11.95 | 2.02 |
| d28 | 11.67 | 20.15 | 30.07 |
| d31 | 14.53 | 11.01 | 2.24 |
| d36 | 19.51 | 29.73 | 55.31 |

LENS UNIT DATA

| Unit | Starting surface | Focal length |
|---|---|---|
| 1 | 1 | 198.37 |
| 2 | 6 | −57.66 |
| 3 | 11 | 83.19 |
| 4 | 17 | −102.78 |
| 5 | 19 | 49.52 |
| 6 | 26 | −59.13 |
| 7 | 29 | 58.56 |
| 8 | 32 | −46.26 |

SINGLE LENS DATA

| Lens | Starting surface | Focal length |
|---|---|---|
| 1 | 1 | 271.21 |
| 2 | 3 | −173.98 |
| 3 | 4 | 139.27 |
| 4 | 6 | −87.02 |
| 5 | 8 | −59.97 |
| 6 | 9 | 91.42 |
| 7 | 11 | 74.39 |

-continued

UNIT mm

| | | |
|---|---|---|
| 8 | 13 | 52.97 |
| 9 | 14 | −44.17 |
| 10 | 17 | −102.78 |
| 11 | 19 | 67.87 |
| 12 | 21 | 56.91 |
| 13 | 22 | −47.25 |
| 14 | 24 | 110.33 |
| 15 | 26 | 66.26 |
| 16 | 27 | −30.76 |
| 17 | 29 | 45.20 |
| 18 | 30 | −198.54 |
| 19 | 32 | −52.24 |
| 20 | 34 | −65.00 |
| 21 | 35 | 78.36 |

Numerical Example 2

UNIT mm

Surface data

| surface number | r | d | nd | vd | θgF |
|---|---|---|---|---|---|
| 1 | 119.358 | 7.73 | 1.49700 | 81.54 | 0.5375 |
| 2 | 1275.564 | 0.20 | | | |
| 3 | 135.831 | 2.70 | 1.61340 | 44.27 | 0.5633 |
| 4 | 64.613 | 10.40 | 1.43875 | 94.66 | 0.5340 |
| 5 | 613.372 | (variable) | | | |
| 6 | 677.114 | 1.50 | 1.69680 | 55.53 | 0.5434 |
| 7 | 59.396 | 4.31 | | | |
| 8 | −57.692 | 1.50 | 1.49700 | 81.54 | 0.5375 |
| 9 | 72.706 | 3.01 | 1.76182 | 26.52 | 0.6136 |
| 10 | 663.179 | (variable) | | | |
| 11 | 51.886 | 6.54 | 1.49700 | 81.54 | 0.5375 |
| 12 | −93.065 | 0.20 | | | |
| 13 | 55.544 | 5.65 | 1.59270 | 35.31 | 0.5933 |
| 14 | −76.962 | 1.80 | 1.95375 | 32.32 | 0.5898 |
| 15 | 93.608 | 5.00 | | | |
| 16 (diaphragm) | ∞ | (variable) | | | |
| 17 | −38.443 | 1.10 | 1.49700 | 81.54 | 0.5375 |
| 18 | −176.882 | (variable) | | | |
| 19 | −332.898 | 4.01 | 1.68893 | 31.07 | 0.6004 |
| 20 | −39.041 | 0.20 | | | |
| 21 | 109.930 | 4.88 | 1.51823 | 58.90 | 0.5457 |
| 22 | −35.252 | 1.30 | 2.05090 | 26.94 | 0.6054 |
| 23 | −212.824 | 0.20 | | | |
| 24 | 46.370 | 3.41 | 1.49700 | 81.54 | 0.5375 |
| 25 | ∞ | (variable) | | | |
| 26 | 119.406 | 2.86 | 1.64769 | 33.79 | 0.5938 |
| 27 | −76.832 | 1.20 | 1.77250 | 49.60 | 0.5520 |
| 28 | 38.643 | (variable) | | | |
| 29 | 57.241 | 5.79 | 1.48749 | 70.23 | 0.5300 |
| 30 | −74.354 | (variable) | | | |
| 31 | −92.834 | 1.40 | 1.59282 | 68.63 | 0.5446 |
| 32 | 46.355 | 4.59 | | | |
| 33 | −64.622 | 1.40 | 1.49700 | 81.54 | 0.5375 |
| 34 | 61.474 | 4.87 | 1.72047 | 34.71 | 0.5834 |
| 35 | −208.837 | (variable) | | | |
| 36 | ∞ | 1.00 | 1.51633 | 64.14 | 0.5353 |
| 37 | ∞ | 1.00 | | | |
| image plane | ∞ | | | | |

VARIOUS DATA
Zoom ratio 4.76

| | wide-angle | middle | Telephoto |
|---|---|---|---|
| Focal length | 103.00 | 225.00 | 490.00 |
| F-number | 4.60 | 5.16 | 7.20 |
| Half angle of view (degree) | 11.86 | 5.49 | 2.53 |
| Image height | 21.64 | 21.64 | 21.64 |
| Overall lens length | 221.52 | 284.18 | 311.52 |
| BF | 21.14 | 32.09 | 63.57 |

-continued

UNIT mm

| | | | |
|---|---|---|---|
| d 5 | 7.56 | 70.22 | 97.56 |
| d10 | 27.18 | 20.78 | 1.30 |
| d16 | 12.74 | 21.19 | 26.16 |
| d18 | 15.60 | 7.14 | 2.17 |
| d25 | 15.53 | 7.98 | 2.30 |
| d28 | 14.98 | 22.53 | 28.21 |
| d30 | 19.04 | 14.49 | 2.50 |
| d35 | 19.48 | 30.43 | 61.91 |

LENS UNIT DATA

| Unit | Starting surface | Focal length |
|---|---|---|
| 1 | 1 | 202.77 |
| 2 | 6 | −58.58 |
| 3 | 11 | 82.07 |
| 4 | 17 | −99.09 |
| 5 | 19 | 48.05 |
| 6 | 26 | −62.75 |
| 7 | 29 | 67.32 |
| 8 | 31 | −51.29 |

SINGLE LENS DATA

| Lens | Starting surface | Focal length |
|---|---|---|
| 1 | 1 | 264.36 |
| 2 | 3 | −203.84 |
| 3 | 4 | 163.66 |
| 4 | 6 | −93.53 |
| 5 | 8 | −64.48 |
| 6 | 9 | 106.95 |
| 7 | 11 | 68.05 |
| 8 | 13 | 55.31 |
| 9 | 14 | −44.06 |
| 10 | 17 | −99.09 |
| 11 | 19 | 63.84 |
| 12 | 21 | 52.11 |
| 13 | 22 | −40.36 |
| 14 | 24 | 93.30 |
| 15 | 26 | 72.60 |
| 16 | 27 | −33.13 |
| 17 | 29 | 67.32 |
| 18 | 31 | −51.96 |
| 19 | 33 | −63.16 |
| 20 | 34 | 66.42 |

Numerical Example 3

UNIT mm

Surface data

| surface number | r | d | nd | vd | θgF |
|---|---|---|---|---|---|
| 1 | 140.436 | 6.50 | 1.49700 | 81.54 | 0.5375 |
| 2 | 2367.137 | 0.20 | | | |
| 3 | 152.737 | 2.70 | 1.61340 | 44.27 | 0.5633 |
| 4 | 71.935 | 9.40 | 1.43875 | 94.66 | 0.5340 |
| 5 | 1232.271 | (variable) | | | |
| 6 | 809.007 | 1.50 | 1.69680 | 55.53 | 0.5434 |
| 7 | 62.205 | 3.70 | | | |
| 8 | −58.277 | 1.50 | 1.49700 | 81.54 | 0.5375 |
| 9 | 78.375 | 2.80 | 1.76182 | 26.52 | 0.6136 |
| 10 | 685.735 | (variable) | | | |
| 11 | 49.577 | 6.00 | 1.49700 | 81.54 | 0.5375 |
| 12 | −72.478 | 0.20 | | | |
| 13 | 62.006 | 6.00 | 1.59270 | 35.31 | 0.5933 |
| 14 | −55.369 | 1.50 | 1.95375 | 32.32 | 0.5898 |
| 15 | 113.703 | 5.00 | | | |
| 16 (diaphragm) | ∞ | (variable) | | | |
| 17 | −35.535 | 1.10 | 1.43875 | 94.93 | 0.5340 |
| 18 | −149.322 | (variable) | | | |

-continued

UNIT mm

| | | | | | |
|---|---|---|---|---|---|
| 19 | −504.865 | 3.50 | 1.69895 | 30.13 | 0.6030 |
| 20 | −39.275 | 0.20 | | | |
| 21 | 144.914 | 5.20 | 1.51742 | 52.43 | 0.5564 |
| 22 | −32.976 | 1.10 | 2.05090 | 26.94 | 0.6054 |
| 23 | −281.312 | 0.20 | | | |
| 24 | 51.291 | 3.50 | 1.49700 | 81.54 | 0.5375 |
| 25 | −180.611 | (variable) | | | |
| 26 | 63.009 | 3.20 | 1.64769 | 33.79 | 0.5938 |
| 27 | −154.556 | 1.20 | 1.77250 | 49.60 | 0.5520 |
| 28 | 36.508 | (variable) | | | |
| 29 | 123.984 | 4.00 | 1.48749 | 70.23 | 0.5300 |
| 30 | −67.413 | 2.07 | | | |
| 31 | −93.888 | 1.40 | 1.59282 | 68.63 | 0.5446 |
| 32 | 81.759 | 3.81 | | | |
| 33 | −48.665 | 1.40 | 1.49700 | 81.54 | 0.5375 |
| 34 | 45.429 | 4.20 | 1.72047 | 34.71 | 0.5834 |
| 35 | 309.933 | (variable) | | | |
| 36 | ∞ | 1.00 | 1.51633 | 64.14 | 0.5353 |
| 37 | ∞ | 1.00 | | | |
| image plane | ∞ | | | | |

VARIOUS DATA
Zoom ratio 4.08

| | wide-angle | middle | Telephoto |
|---|---|---|---|
| Focal length | 103.00 | 200.00 | 420.00 |
| F-number | 4.60 | 5.20 | 7.20 |
| Half angle of view (degree) | 11.86 | 6.17 | 2.95 |
| Image height | 21.64 | 21.64 | 21.64 |
| Overall lens length | 220.96 | 276.04 | 310.96 |
| BF | 20.26 | 33.96 | 61.19 |
| d 5 | 13.70 | 68.29 | 98.51 |
| d10 | 26.57 | 19.68 | 2.49 |
| d16 | 13.53 | 18.59 | 24.22 |
| d18 | 23.32 | 18.27 | 12.63 |
| d25 | 20.76 | 12.22 | 1.50 |
| d28 | 19.73 | 21.94 | 27.34 |
| d35 | 18.60 | 32.31 | 59.53 |

LENS UNIT DATA

| Unit | Starting surface | Focal length |
|---|---|---|
| 1 | 1 | 217.86 |
| 2 | 6 | −59.49 |
| 3 | 11 | 76.54 |
| 4 | 17 | −106.60 |
| 5 | 19 | 50.37 |
| 6 | 26 | −89.98 |
| 7 | 29 | −106.51 |

SINGLE LENS DATA

| Lens | Starting surface | Focal length |
|---|---|---|
| 1 | 1 | 300.10 |
| 2 | 3 | −224.53 |
| 3 | 4 | 173.69 |
| 4 | 6 | −96.79 |
| 5 | 8 | −67.01 |
| 6 | 9 | 115.92 |
| 7 | 11 | 60.22 |
| 8 | 13 | 50.31 |
| 9 | 14 | −38.87 |
| 10 | 17 | −106.60 |
| 11 | 19 | 60.74 |
| 12 | 21 | 52.44 |
| 13 | 22 | −35.63 |
| 14 | 24 | 80.78 |
| 15 | 26 | 69.51 |
| 16 | 27 | −38.12 |
| 17 | 29 | 90.20 |
| 18 | 31 | −73.50 |
| 19 | 33 | −47.04 |
| 20 | 34 | 73.40 |

Numerical Example 4

UNIT mm
Surface data

| surface number | r | d | nd | vd | θgF |
|---|---|---|---|---|---|
| 1 | 125.303 | 7.20 | 1.49700 | 81.54 | 0.5375 |
| 2 | 1349.970 | 0.20 | | | |
| 3 | 143.597 | 2.70 | 1.61340 | 44.27 | 0.5633 |
| 4 | 67.440 | 10.20 | 1.43875 | 94.66 | 0.5340 |
| 5 | 869.861 | (variable) | | | |
| 6 | 556.896 | 1.50 | 1.69680 | 55.53 | 0.5434 |
| 7 | 62.809 | 4.60 | | | |
| 8 | −60.154 | 1.50 | 1.49700 | 81.54 | 0.5375 |
| 9 | 75.026 | 3.70 | 1.76182 | 26.52 | 0.6136 |
| 10 | 458.373 | (variable) | | | |
| 11 | 53.374 | 7.00 | 1.49700 | 81.54 | 0.5375 |
| 12 | −98.961 | 0.20 | | | |
| 13 | 51.693 | 6.80 | 1.59270 | 35.31 | 0.5933 |
| 14 | −86.480 | 1.80 | 1.95375 | 32.32 | 0.5898 |
| 15 | 82.971 | 5.00 | | | |
| 16 (diaphragm) | ∞ | (variable) | | | |
| 17 | −38.202 | 1.10 | 1.49700 | 81.54 | 0.5375 |
| 18 | −265.191 | (variable) | | | |
| 19 | −442.988 | 3.90 | 1.68893 | 31.07 | 0.6004 |
| 20 | −39.189 | 0.20 | | | |
| 21 | 100.464 | 4.92 | 1.51823 | 58.90 | 0.5457 |
| 22 | −35.777 | 1.30 | 2.05090 | 26.94 | 0.6054 |
| 23 | −270.993 | 0.20 | | | |
| 24 | 43.733 | 3.55 | 1.49700 | 81.54 | 0.5375 |
| 25 | ∞ | (variable) | | | |
| 26 | 151.038 | 2.80 | 1.64769 | 33.79 | 0.5938 |
| 27 | −75.263 | 1.20 | 1.77250 | 49.60 | 0.5520 |
| 28 | 40.103 | (variable) | | | |
| 29 | 55.823 | 5.70 | 1.48749 | 70.23 | 0.5300 |
| 30 | −80.392 | (variable) | | | |
| 31 | −181.512 | 1.40 | 1.59282 | 68.63 | 0.5446 |
| 32 | 51.923 | 4.00 | | | |
| 33 | −110.252 | 1.40 | 1.49700 | 81.54 | 0.5375 |
| 34 | 57.588 | 5.08 | 1.72047 | 34.71 | 0.5834 |
| 35 | −202.772 | (variable) | | | |
| 36 | −52.955 | 1.80 | 1.53775 | 74.70 | 0.5392 |
| 37 | −160.679 | (variable) | | | |
| 38 | ∞ | 1.00 | 1.51633 | 64.14 | 0.5353 |
| 39 | ∞ | 1.00 | | | |
| image plane | ∞ | | | | |

VARIOUS DATA
Zoom ratio 4.76

| | wide-angle | middle | Telephoto |
|---|---|---|---|
| Focal length | 103.00 | 225.00 | 490.00 |
| F-number | 4.60 | 5.19 | 7.20 |
| Half angle of view (degree) | 11.86 | 5.49 | 2.53 |
| Image height | 21.64 | 21.64 | 21.64 |
| Overall lens length | 230.09 | 290.79 | 320.09 |
| BF | 16.66 | 28.33 | 59.19 |
| d 5 | 7.20 | 67.90 | 97.20 |
| d10 | 29.58 | 21.54 | 1.47 |
| d16 | 16.91 | 24.64 | 29.58 |
| d18 | 15.72 | 7.99 | 3.05 |
| d25 | 15.04 | 8.88 | 2.30 |
| d28 | 12.92 | 19.08 | 25.66 |
| d30 | 17.10 | 11.90 | 2.50 |
| d35 | 8.00 | 9.57 | 8.18 |
| d37 | 15.00 | 26.67 | 57.53 |

LENS UNIT DATA

| Unit | Starting surface | Focal length |
|---|---|---|
| 1 | 1 | 207.52 |
| 2 | 6 | −60.52 |
| 3 | 11 | 83.27 |
| 4 | 17 | −89.95 |
| 5 | 19 | 46.55 |

-continued

UNIT mm

| | | |
|---|---|---|
| 6 | 26 | −60.81 |
| 7 | 29 | 68.52 |
| 8 | 31 | −88.39 |
| 9 | 36 | −147.75 |

SINGLE LENS DATA

| Lens | Starting surface | Focal length |
|---|---|---|
| 1 | 1 | 277.37 |
| 2 | 3 | −210.14 |
| 3 | 4 | 165.99 |
| 4 | 6 | −101.73 |
| 5 | 8 | −66.93 |
| 6 | 9 | 117.27 |
| 7 | 11 | 70.85 |
| 8 | 13 | 55.61 |
| 9 | 14 | −44.17 |
| 10 | 17 | −89.95 |
| 11 | 19 | 62.16 |
| 12 | 21 | 51.54 |
| 13 | 22 | −39.33 |
| 14 | 24 | 87.99 |
| 15 | 26 | 77.94 |
| 16 | 27 | −33.71 |
| 17 | 29 | 68.52 |
| 18 | 31 | −67.95 |
| 19 | 33 | −75.90 |
| 20 | 34 | 62.76 |
| 21 | 36 | −147.75 |

TABLE 1

| Expressions | | Example | | | |
|---|---|---|---|---|---|
| | | 1 | 2 | 3 | 4 |
| (1) $60 < \nu d < 100$ | 11 | 81.54 | 81.54 | 81.54 | 81.54 |
| | 13 | 81.54 | 94.66 | 94.66 | 94.66 |
| | 22 | 81.54 | 81.54 | 81.54 | 81.54 |
| | 31 | 94.66 | 81.54 | 81.54 | 81.54 |
| | 41 | 80.47 | 81.54 | 94.93 | 81.54 |
| | 54 | 81.54 | 81.54 | 81.54 | 81.54 |
| | 72 | — | — | 68.63 | — |
| | 73 | — | — | 81.54 | — |
| | 81 | 68.63 | 68.63 | — | 68.63 |
| | 82 | 81.54 | 81.54 | — | 81.54 |
| | 91 | — | — | — | 74.70 |
| (2) $-0.00047 \times \nu d + 0.56660 < \theta gF < -0.0047 \times \nu d + 0.5966$ | 11 | 0.5375 | 0.5375 | 0.5375 | 0.5375 |
| | 13 | 0.5375 | 0.5340 | 0.5340 | 0.5340 |
| | 22 | 0.5375 | 0.5375 | 0.5375 | 0.5375 |
| | 31 | 0.5340 | 0.5375 | 0.5375 | 0.5375 |
| | 41 | 0.5550 | 0.5375 | 0.5340 | 0.5375 |
| | 54 | 0.5375 | 0.5375 | 0.5375 | 0.5375 |
| (3) $-0.00274 \times \nu d + 0.7144 < \theta gF$ | 72 | — | — | 0.5446 | — |
| | 73 | — | — | 0.5375 | — |
| | 81 | 0.5446 | 0.5446 | — | 0.5446 |
| | 82 | 0.5375 | 0.5375 | — | 0.5375 |
| | 91 | — | — | — | 0.5392 |
| (4) $1.00 < f4/f2 < 2.00$ | | 1.782 | 1.692 | 1.792 | 1.486 |
| (5) $0.30 < f1/ft < 0.70$ | | 0.401 | 0.414 | 0.519 | 0.424 |
| (6) $0.80 < fn2/f2 < 1.50$ | | 1.040 | 1.101 | 1.126 | 1.106 |
| (7) $0.50 < fp3/f3 < 1.10$ | | 0.894 | 0.829 | 0.787 | 0.851 |
| (8) $3.5 < ft/fw < 7.0$ | | 4.81 | 4.76 | 4.08 | 4.76 |

Figure 9:
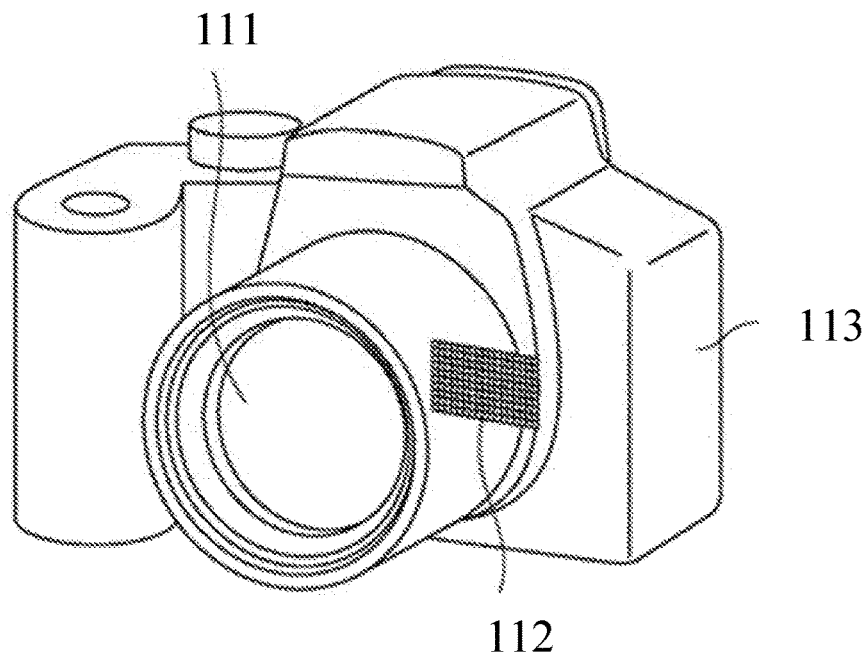
FIG. 9 is a schematic diagram of an image pickup apparatus including the zoom lens according to each example.

Referring now to FIG. 9, a description will be given of an example of a digital still camera (image pickup apparatus 10) using the zoom lens according to each embodiment as an image pickup optical system. FIG. 9 is a schematic diagram of the image pickup apparatus 10 including the zoom lens according to each example.

In FIG. 9, reference numeral 113 denotes a camera body, and reference numeral 111 denotes an image pickup optical system configured by any of the zoom lenses 1a to 1d described according to Examples 1 to 4. Reference numeral 112 denotes an image sensor (photoelectric conversion element) such as a CCD sensor and a CMOS sensor which is built in the camera body 113, receives and photoelectrically converts the optical image formed by the image pickup optical system 111. The camera body 113 may be a so-called single lens reflex camera having a quick turn mirror or a so-called mirrorless camera having no quick turn mirror.

Each example can provide a zoom lens and an image pickup apparatus having the well-corrected longitudinal and lateral chromatic aberrations at the telephoto end even with a high zoom ratio.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-123387, filed on Jul. 2, 2019 which is hereby incorporated by reference herein in its entirety.

What is claimed is:

1. A zoom lens comprising, in order from an object side to an image side, a first lens unit having a positive refractive power, a second lens unit having a negative refractive power, a third lens unit having a positive refractive power, a fourth lens unit having a negative refractive power, and a rear unit having a plurality of lens units, a distance between adjacent lens units changing during zooming, wherein at least one positive lens in the first lens unit, at least one negative lens in the second lens unit, and at least one negative lens in the fourth lens unit satisfy: the following first conditional expressions $60 < \nu d < 100$ $-0.00047 \times \nu d + 0.5666 < \theta gF < -0.00047 \times \nu d + 0.5966$ $-0.00274 \times \nu d + 0.7144 < \theta gF$ where $\nu d$ is an Abbe number and $\theta gF$ is a partial dispersion ratio; and wherein the zoom lens satisfies the following second conditional expression $1.00 < f4/f2 < 2.00$ where f2 is a focal length of the second lens unit and f4 is a focal length of the fourth lens unit.

2. The zoom lens according to claim 1, wherein at least two positive lenses in the first lens unit satisfy the first conditional expressions.

3. The zoom lens according to claim 1, wherein the following conditional expression is satisfied:

$0.30 < f1/ft < 0.70$ where f1 is a focal length of the first lens unit and ft is a focal length of the zoom lens at the telephoto end.

4. The zoom lens according to claim 1, wherein the following conditional expression is satisfied:

$0.80 < fn2/f2 < 1.50$ where fn2 is a focal length of the at least one negative lens that satisfies the first conditional expressions in the second lens unit.

5. The zoom lens according to claim 1, wherein at least one positive lens in the third lens unit satisfies the first conditional expressions.

6. The zoom lens according to claim 1, wherein the following conditional expression is satisfied:

$$0.50 < fp3/f3 < 1.10$$

where fp3 is a focal length of the at least one positive lens that satisfies the first conditional expressions in the third lens unit and f3 is a focal length of the third lens unit.

7. The zoom lens according to claim 1, wherein a fifth lens unit disposed closest to an object in the rear unit has a positive refractive power, and
   wherein at least one positive lens in the fifth lens unit satisfies the first conditional expressions.

8. The zoom lens according to claim 1, wherein a lens unit disposed closest to an image plane in the rear unit has a negative refractive power, and
   wherein at least one negative lens in the lens unit disposed closest to the image plane in the rear unit satisfies the first conditional expressions.

9. The zoom lens according to claim 1, wherein the following conditional expression is satisfied:

$$3.5 < ft/fw < 7.0$$

where fw is a focal length of the zoom lens at the wide-angle end and ft is a focal length of the zoom lens at the telephoto end.

10. The zoom lens according to claim 1, wherein the rear unit includes, in order from the object side to the image side, a fifth lens unit having a positive refractive power, a sixth lens unit having a negative refractive power, a seventh lens unit having a positive refractive power, and an eighth lens unit having a negative refractive power.

11. The zoom lens according to claim 1, wherein the rear unit includes, in order from the object side to the image side, a fifth lens unit having a positive refractive power, a sixth lens unit having a negative refractive power, and a seventh lens unit having a negative refractive power.

12. The zoom lens according to claim 1, wherein the rear unit includes, in order from the object side to the image side, a fifth lens unit having a positive refractive power, a sixth lens unit having a negative refractive power, a seventh lens unit having a positive refractive power, an eighth lens unit having a negative refractive power, and a ninth lens unit having a negative refractive power.

13. An image pickup apparatus comprising a zoom lens, wherein the zoom lens includes, in order from an object side to an image side, a first lens unit having a positive refractive power, a second lens unit having a negative refractive power, a third lens unit having a positive refractive power, a fourth lens unit having a negative refractive power, and a rear unit having a plurality of lens units, a distance between adjacent lens units changing during zooming, and
   wherein at least one positive lens in the first lens unit, at least one negative lens in the second lens unit, and at least one negative lens in the fourth lens unit satisfy:
   the following first conditional expressions $$60 < vd < 100$$

$$-0.00047 \times vd + 0.5666 < \theta gF < -0.00047 \times vd + 0.5966$$

$$-0.00274 \times vd + 0.7144 < \theta gF$$

where vd is an Abbe number and θgF is a partial dispersion ratio; and
   wherein the zoom lens satisfies the following second conditional expression $$1.00 < f4/f2 < 2.00$$

where f2 is a focal length of the second lens unit and f4 is a focal length of the fourth lens unit.

* * * * *